United States Patent
Moore et al.

(10) Patent No.: US 12,215,050 B2
(45) Date of Patent: Feb. 4, 2025

(54) ADDITIVE MANUFACTURING PHASE SEPARATING COMPOSITIONS TO PREPARE GLASSES AND CERAMICS

(71) Applicant: ETH Zürich, Zürich (CH)

(72) Inventors: David Moore, Basel (CH); Lorenzo Barbera, Dübendorf (CH); Kunal Masania, Zürich (CH); André R. Studart, Zürich (CH)

(73) Assignee: ETH Zürich, Zurich (CH)

( * ) Notice: Subject to any disclaimer, the term of this patent is extended or adjusted under 35 U.S.C. 154(b) by 814 days.

(21) Appl. No.: 17/271,318

(22) PCT Filed: Aug. 28, 2019

(86) PCT No.: PCT/EP2019/072992
§ 371 (c)(1),
(2) Date: Feb. 25, 2021

(87) PCT Pub. No.: WO2020/043788
PCT Pub. Date: Mar. 5, 2020

(65) Prior Publication Data
US 2021/0198140 A1    Jul. 1, 2021

(30) Foreign Application Priority Data

Aug. 28, 2018 (EP) .................................. 18191209

(51) Int. Cl.
| | |
|---|---|
| *C08F 2/46* | (2006.01) |
| *B33Y 10/00* | (2015.01) |
| *B33Y 70/10* | (2020.01) |
| *B33Y 80/00* | (2015.01) |
| *C03B 19/12* | (2006.01) |
| *C03C 1/00* | (2006.01) |
| *C08F 2/50* | (2006.01) |
| *C08G 61/04* | (2006.01) |

(52) U.S. Cl.
CPC .............. *C03C 1/006* (2013.01); *B33Y 10/00* (2014.12); *B33Y 70/10* (2020.01); *B33Y 80/00* (2014.12); *C03B 19/12* (2013.01); *C08F 2/46* (2013.01); *C03C 2203/26* (2013.01)

(58) Field of Classification Search
CPC ..... C03C 1/006; C03C 2203/26; C03B 19/12; B33Y 10/00; B33Y 80/00; B33Y 70/10; C08F 2/46
USPC ...................... 522/6, 189, 184, 71, 1; 520/1
See application file for complete search history.

(56) References Cited

U.S. PATENT DOCUMENTS

2018/0036945 A1    2/2018 Lereboullet et al.

FOREIGN PATENT DOCUMENTS

| EP | 0 363 697 A1 | 4/1990 |
| WO | 2017/029673 A1 | 2/2017 |
| WO | 2018/065093 A1 | 4/2018 |

OTHER PUBLICATIONS

Cooperstein et al, May 9, 2018, Additive Manufacturing of Transparent Silica Glass from Solutions, ACS Appl. Moser, Interfaces, 10, 18879-18885 (Year: 2018).*

Ido Cooperstein et al., "Additive Manufacturing of Transparent Silica Glass from Solutions", XP-002789744, ACS Appl. Mater. Interfaces, 2018, pp. 18879-18885, vol. 10, No. 22 (7 pages).

International Search Report of PCT/EP2019/072992 dated Oct. 21, 2019 [PCT/ISA/210].

Written Opinion of PCT/EP2019/072992 dated Oct. 21, 2019 [PCT/ISA/237].

* cited by examiner

*Primary Examiner* — Jessica Whiteley
(74) *Attorney, Agent, or Firm* — Sughrue Mion, PLLC

(57) ABSTRACT

The present invention provides additive manufacturing compositions, also referred as "inks" in the field of additive manufacturing, which can be fine-tuned with respect to porosity by varying the intensity of the photopolymerisation light source and which can further be used to obtain objects out of glasses, ceramics or glass-ceramics and their respective alloys.

15 Claims, 5 Drawing Sheets a)

b)

c)

a)

b)

c)

ADDITIVE MANUFACTURING PHASE SEPARATING COMPOSITIONS TO PREPARE GLASSES AND CERAMICS

TECHNICAL FIELD

The present invention relates to flowable additive manufacturing compositions, which are suitable in particular for stereolithography-type processes and which compositions are capable of phase separation into a biphasic bi-continuous structure upon being irradiated with light.

PRIOR ART

The advent of 3D printing technologies has opened enticing new possibilities for the manufacturing of complex-shaped objects in a fully digital fabrication process. In the context of glasses and/or ceramics, 3D printing can potentially combine the automation offered by modern industrial process with the complex geometries accessible by manual artistic labor. Recent developments in this direction have enabled 3D printing of glass objects by direct extrusion of the glass material in its molten state or by stereolithographic patterning (SLA) of particle suspension inks at room temperature.

Direct extrusion of molten glass material is a technique that circumvents the high shrinking of conventional powder-based processes, thus minimizing defects associated with inhomogeneous powder densification but remains a costly, high-energy application in which geometric complexity and scale of the manufactured object remains limited due to the large filament diameters. A strategy to overcome the limitations posed by molten glass extrusion has been the use of particle-based inks for casting and in particular direct ink writing. The major limitations of additive manufacturing using such inks however, are i) high use of solvent limiting ink strength and ii) feature size being limited because only a small portion of the printed structure contains crosslinked resin. Stereolithography using nanoparticle inks is an alternative cost-effective approach to achieve parts with higher geometric complexity but have so far only been demonstrated using $SiO_2$ nanoparticles, which limits the available chemistries. By contrast, examples of commercial glasses such as bioactive glass for bone regeneration, high-strength Gorilla glass for displays and glass fibers for optical communications, show that interesting functional properties often require compositions containing more than one oxide. Therefore, the development of technologies that broaden the printing compositional design space and improve the resolution is key to advance this class of materials.

WO2018/065093 A1 discloses a composition capable of being used in a stereolithographic process to obtain a quartz glass object, in which quartz glass particles are dispersed in a polymerizable organic polymer precursor that forms a green body that can be fired to obtain a quartz glass object. The compositions exhibit a high particle load, high viscosity of 2.82 Pas, and therefore offer low resolution.

US2018/0036945 A1 discloses a composition capable of being used in a stereolithographic process to obtain an object, in which an inorganic material powder is dispersed in a photocurable organic polymer precursor and the composition is degassed to avoid the formation of voids in the fired object. This approach relies on the removal of bubbles from objects printed from suspensions and slurries, but does not solve design challenges such as viscosity, debinding, and sintering.

"Additive Manufacturing of Transparent Silica Glass from Solutions" by Ido Cooperstein, Efrat Shukrun, Ofir Press, Alexander Kamyshny, and Shlomo Magdassi *ACS Applied Materials & Interfaces* 2018 10 (22), 18879-18885 discloses an aqueous photopolymerizable sol-gel composition capable of being 3D printed and fired into silica glass. With this approach, the ceramic precursor must be acrylated and therefore is limited to select few alkoxides such as tetraethylorthosilicate. The monophasic sol-gel inks disclosed in Cooperstein are not capable of forming into a bi-continuous and bi-phasic structure upon irradiation.

SUMMARY OF THE INVENTION

The present invention provides additive manufacturing compositions, also referred as "inks" in the field of additive manufacturing, which can be conveniently used to manufacture objects via additive manufacturing, can be fine-tuned with respect to phase separation and subsequent porosity by varying the intensity of the photopolymerisation light source and which can be used to obtain objects out of glasses, ceramics or glass-ceramics and their respective alloys.

It is an object of the present invention to provide a composition, in particular an additive manufacturing composition, which composition comprises a continuous liquid phase capable of photoinduced phase separation into a bi-continuous bi-phasic structure comprising at least one or more inorganic precursor compounds, in particular alkoxylated inorganic precursor compounds, which inorganic precursor compounds are preferably not photopolymerizable, and one or more photopolymerizable organic polymer precursor compound.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 a schematic step-by-step illustration of the photoinduced phase separation in the continuous liquid phase of the additive manufacturing composition according to the present invention. In (a), the photopolymerizable organic polymer precursor compound (diamonds) and alkoxylated inorganic precursor compound (black lines) are irradiated. In (b) a bi-phasic and bi-continuous structure consisting of a continuous organic polymer phase (dashed line on white background) and alkoxylated inorganic precursor compound (solid black line on dotted background) is formed and grows in to a coarser structure, which is then pyrolyzed as depicted in (c).

DESCRIPTION OF PREFERRED EMBODIMENTS

Figure 1:
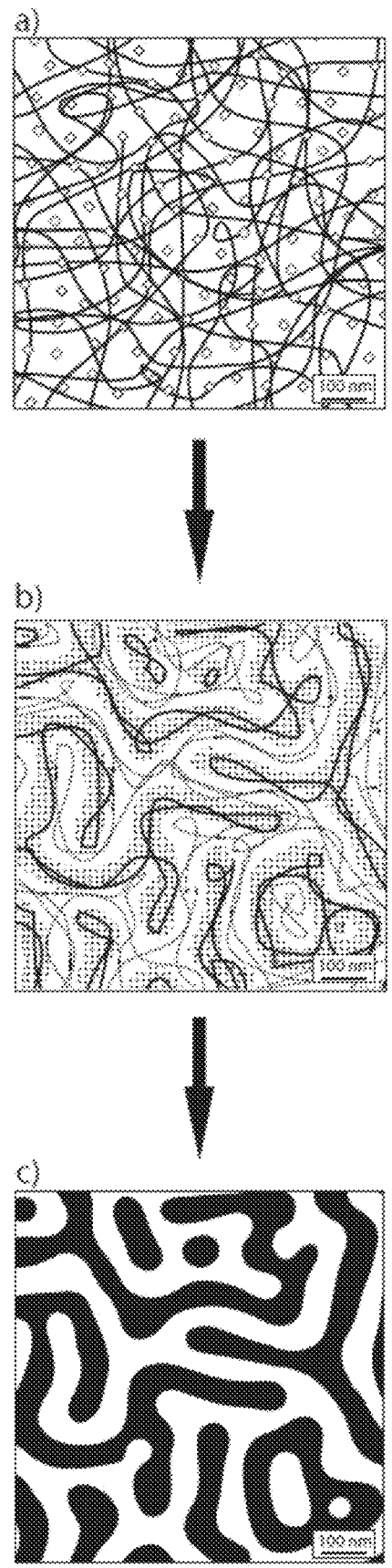
Figure 2:
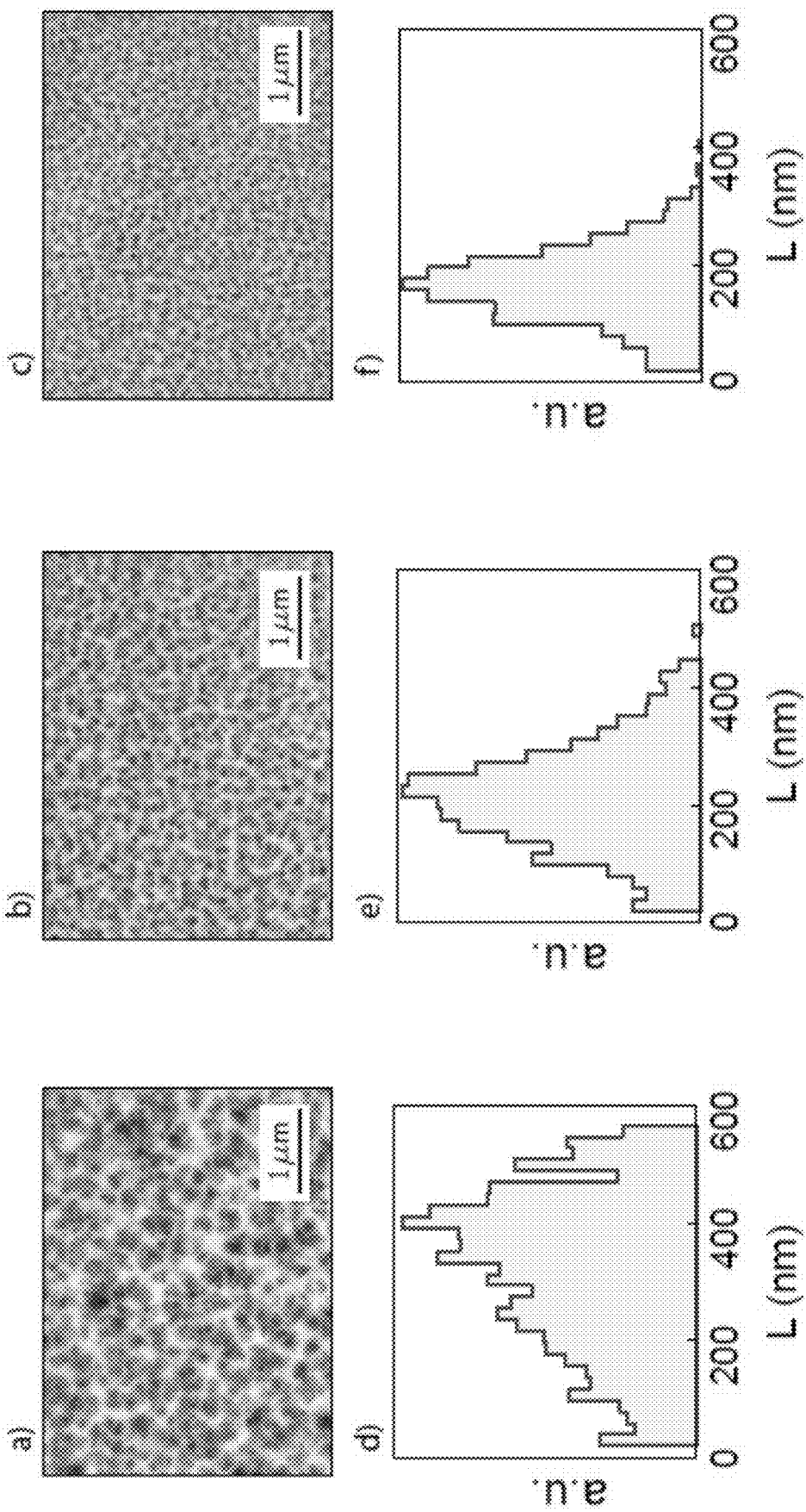
FIG. 2 backscatter SEM images in a) to c), which show a cross-section of the bi-phasic and bi-continuous 3D structure of a pyrolyzed sample obtained by irradiating an additive manufacturing composition according to the present invention at different light intensities: (a) 0.22 mW/cm$^2$, (b) 2.20 mW/cm$^2$, and (c) 22.00 mW/cm$^2$. Exposure dose was held constant at 48.4 mJ/cm$^2$ for any given exposure. In d) to e), histograms show the strut size distribution in the range of 150 to 330 nm in each case. The bi-phasic and bi-continuous 3D structure shown was obtained using the composition according to Resin 2 as disclosed in Table S1.
Figure 3:
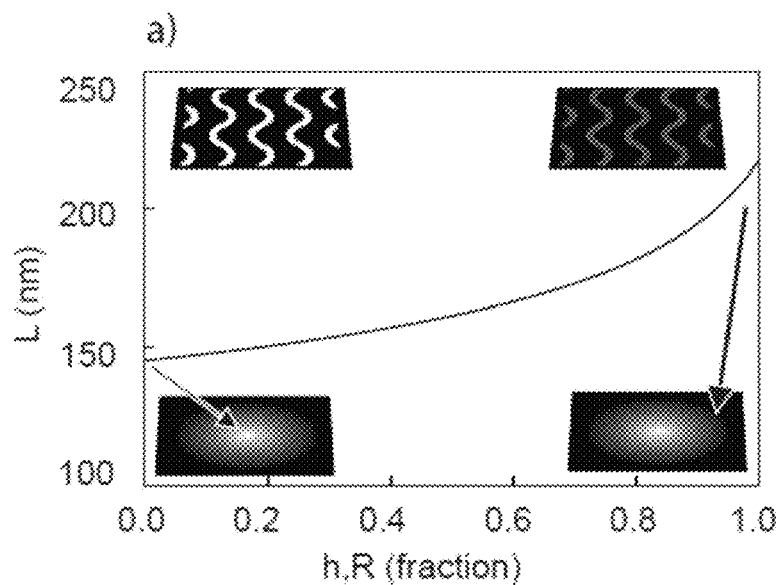
FIG. 3 shows (a) graded porous inks can be used to tune the porosity, which affects the debinding and sintering kinetics in 3D. The plot shows the average strut size in function of position for structures printed with radial (R) or vertical (h) light intensity gradient. Example objects with gradients in porosity were produced: (b) radial gradient and (c) vertical gradient.
Figure 3:
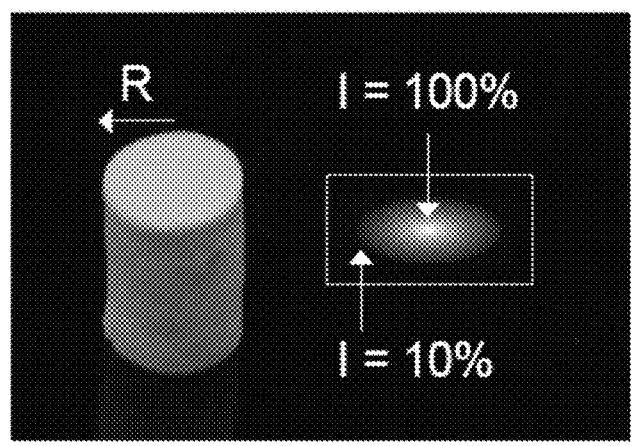
Figure 3:
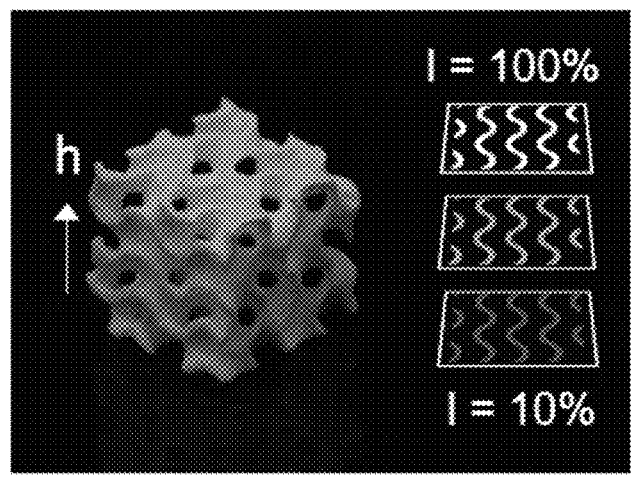

It is an object of the present invention to provide a composition, in particular an additive manufacturing composition, which composition comprises a continuous liquid phase capable of photoinduced phase separation into a bi-continuous bi-phasic structure comprising at least one or more inorganic precursor compounds, which are preferably not photopolymerizable, and one or more photopolymerizable organic polymer precursor compound. In a more preferred embodiment, the continuous liquid phase capable of photoinduced phase separation into a bi-continuous bi-phasic structure comprises at least two or more inorganic precursor compounds, in particular two or more alkoxylated inorganic precursor compounds. It is understood that in addition to the continuous liquid phase, the composition may further comprise one or more solid additives such as for example solid particulates or may alternatively be free of solid particulates.

The photoinduced phase separation in the continuous liquid phase of the additive manufacturing composition may be triggered by any suitable wavelength, intensity and dose of radiation. Examples of such suitable wavelength of radiation are visible light, UV, IR, e-beam or gamma rays and the particular use of a given radiation will most often depend on the type of photopolymerizable organic polymer precursor compound. Sources that can provide such radiation are well-known in the art, such as for example light emitting diodes, incandescent lamps and discharge lamps. The additive manufacturing compositions of the present invention are further capable of forming bi-continuous bi-phasic structure of different sizes, depending on the intensity of radiation provided. For instance, when a high intensity radiation is provided to the additive manufacturing composition, the formed bi-continuous bi-phasic structure will have a smaller scale, i.e. the struts or channels of the interconnecting network of both phases will have smaller diameter, whereas when a weak radiation intensity is provided to the additive manufacturing composition, the formed bi-continuous bi-phasic structure will have a larger scale, i.e. the struts or channels of the interconnecting network of both phases will have larger diameter. Thus, the additive manufacturing composition can be tuned with respect to the scale of the resulting bi-continuous bi-phasic structure by tuning the intensity of radiation. An exemplary intensity range by which a roughly two-fold change in strut diameter from 150 to 330 nm can be achieved with a radiation having a wavelength of about 405 nm is from 22 mW/cm$^2$ to 0.22 mW/cm$^2$.

It has been shown that the additive manufacturing compositions form a bi-continuous bi-phasic structure upon irradiation because the photopolymerizable polymer organic precursor compound will start polymerizing and form a solid phase of continuous phase of organic polymer being percolated with a liquid continuous phase of inorganic precursor compound. Without wishing to be bound to a certain theory, it has been found so far that in the compositions claimed and exemplified hereinbelow, the photoinduced phase separation of the continuous liquid phase of the additive manufacturing composition proceeds according to the mechanism of spinodal decomposition. The formation of a bi-continuous bi-phasic structure allows to form a green body which can be easily fired in a standard furnace, i.e. without limitations to the heating rate and/or atmosphere, because products of thermal decomposition of the organic polymer will be able to escape through the interconnecting cavities and channels of the continuous organic polymer phase, when compared to the case where non-continuous inclusions or droplets of organic polymer thermally decompose by shattering the surrounding inorganic structure. Furthermore, the use of two or more inorganic precursor compounds allows to reduce the time needed to arrive at an inorganic object because the further firing temperature of the green body to form an object essentially consisting of an inorganic non-crystalline amorphous solid, an inorganic crystalline solid or an inorganic mixed crystalline-amorphous solid is below 1000° C.

In a preferred embodiment of the additive manufacturing compositions according to the present invention, the continuous liquid phase further comprises one or more dye and/or one or more photoinitiator. The inclusion of one or more dye and/or one or more photoinitiator allows for a more efficient additive manufacturing process, since they allow to more precisely delimit the part of the body (or voxel in the context of stereolithography) of additive manufacturing composition being irradiated because of the increased absorption. The additive manufacturing compositions according to the present invention may further include a polymerization inhibitor.

An exemplary dye suitable for use in the continuous liquid phase is 1-(phenyldiazenyl)naphthalen-2-ol or Sudan I and an exemplary photoiniator suitable for use in the continuous liquid phase is diphenyl (2,4,6-trimethylbenzoyl)-phosphine oxide.

In a preferred embodiment of the additive manufacturing compositions according to the present invention, in the continuous liquid phase, the one or more inorganic precursor compound is selected from alkoxylated inorganic precursor compound such as alkoxylated siloxanes, alkoxylated or alkylated silazanes, alkoxylated or alkylated carbosilanes, alkoxylated phosphates, alkoxylated titanates, alkoxylated zirconates, alkoxylated aluminates, alkoxylated stannates, alkoxylated borates, halogenated inorganic precursor compounds such as chlorinated inorganic precursors (e.g. AgCl, HAuCl$_4$, TiCl$_4$) and combinations thereof, alkylated inorganic precursor compounds and combinations thereof, and hydroxylated inorganic precursor compounds and combinations thereof.

In a preferred embodiment of the additive manufacturing compositions according to the present invention, in the continuous liquid phase, the one or more inorganic precursor compound may be liquid itself or in the case it is a solid, it may be dissolved in a solvent.

In particular, the additive manufacturing compositions may comprise at least two or more inorganic precursor compounds chosen the above-mentioned inorganic precursor compounds. In the case where the two or more inorganic precursor compounds are chosen from alkoxylated inorganic precursor compounds, the two or more inorganic precursor compounds are preferably chosen from alkoxylated siloxanes, alkoxylated borates and alkoxylated phosphates. By including two or more inorganic precursor compounds, an inorganic oxide alloy object is obtained after firing of the green body. Exemplary combinations of two inorganic precursor compounds chosen from inorganic precursor compounds are combinations of alkoxylated siloxanes and alkoxylated borates, of alkoxylated siloxanes and alkoxylated phosphates, and of alkoxylated phosphates and alkoxylated borates. Exemplary combinations of three or more inorganic precursors are combinations of alkoxylated siloxanes and alkoxylated borates with alkoxylated phosphates.

In a further embodiment, the additive manufacturing compositions may comprise one or more, preferably two or more, inorganic precursor compounds chosen from alkoxylated siloxanes, alkoxylated borates, and alkoxylated phosphates in which the alkoxylated siloxanes are present as the main component by weight or volume, with respect to the total weight or volume of the one or more alkoxylated inorganic precursor compounds comprised in the continuous liquid phase.

In another embodiment of the additive manufacturing compositions according to the present invention, in the continuous liquid phase, the one or more inorganic precursor compound may be present in a range of from 20 volume % to 80 volume %, preferably 30 volume % to 70 volume %, more preferably 40 volume % to 60 volume % with respect to the total volume of the continuous liquid phase capable of photoinduced phase separation into a bi-continuous bi-phasic structure.

It is understood that the inorganic precursor compound may be in the form of monomers, oligomers, or polymers of the condensation product such as for example tetraethoxysilane in the case of alkoxylated siloxanes, or oligomers or polymers thereof such as poly(tetraethoxysilane).

Exemplary alkoxylated siloxanes are tetramethoxysilane, tetraethoxysilane, tetra n-propoxysilane, tetra iso-propoxysilane, tetra tert-butyloxysilane, tetra n-butyloxysilane and oligomers or polymers thereof, which oligomers or polymers may be homo- or hetero-oligomers or polymers thereof. In particular tetraethoxysilane or a polymer thereof, poly(diethoxysiloxane) are suitable as alkoxylated inorganic precursor compounds. In the case where the inorganic precursor compounds are oligomers of polymers of alkoxylated siloxanes, the viscosity of such alkoxylated inorganic precursor compounds is preferably less than 1000 mPas at 25° C., or more preferably between 0.1 mPas and 500 mPas at 25° C., and most preferably between 0.1 mPas and 10 mPas at 25° C.

Exemplary alkoxylated borates are trimethylborate, triethylborate, tri-iso-propylborate, tri n-propylborate.

Exemplary alkoxylated titanates are titanium tetramethoxide, titanium tetraethoxide, titanium tetra(iso/n)propoxide, titanium tetra(n/tert)butoxide, and titanium tetra n-butoxide oligomer where titanium tetra n-butoxide oligomer or polymer is preferred.

Exemplary alkoxylated phosphates are trimethylphosphate, triethylphosphate, tri(iso/n)propylphospate, tri(n/tert)butylphospate. In particular triethylphosphate is suitable as alkoxylated inorganic precursor compounds.

Exemplary alkoxylated zirconates are zirconium tetramethoxide, zirconium tetraethoxide, zirconium tetra(iso/n) propoxide, zirconium tetra(n/tert)butoxide, and zirconium tetra n-butoxide oligomer or polymer.

Exemplary alkoxylated aluminates are aluminium methoxide, aluminium ethoxide, aluminium isopropoxide, aluminium n-propoxide, aluminium tert-butoxide, aluminium n-butoxide and in particular aluminium isopropoxide, aluminium n-propoxide and diethoxysiloxane-butylaluminate copolymer.

Exemplary alkoxylated borates are trimethyl borate, triethyl borate, triisopropyl borate, tri n-propyl borate, tri tert-butyl borate tri n-butyl borate and in particular trimethyl borate.

Exemplary alkoxylated tin derivatives are tin (II) 2-ethylhexanoate.

Exemplary alkylated inorganic precursor compounds are alkylated silazanes or alkylated carbosilanes such as hexamethyldisilazane, silanes such as methylsilane, ethylsilane and polymers thereof, known as silicones.

Exemplary halogenated inorganic precursor compounds are halogenated titanates, in particular chlorotitanates such as tetrachloride. Othe suitable halogenated inorganic precursor compounds are silver and/or gold-based chlorides such as tetrachloroauric acid or silver chloride.

Exemplary hydroxylated inorganic precursor compounds are for example boric acid.

In a preferred embodiment of the additive manufacturing compositions according to the present invention, in the continuous liquid phase, the one or more photopolymerizable organic polymer precursor compound is selected from polyolefin precursor compounds such as acrylate polymer precursor compounds, vinyl polymer precursor compounds, urethane acrylate precursor compounds such as diurethane dimethacrylate and derivatives thereof.

In the case where the photopolymerizable organic polymer precursor compound is a acrylate polymer precursor compound, the acrylate organic polymer precursor compound is preferably chosen among mono-, di-, tri-, or tetraacrylate polymer precursor compounds.

Exemplary monoacrylate polymer precursor compounds are acrylic acid, methacrylic acid, alkyl acrylates such as methyl or ethyl acrylate, alkyl methacrylates such as methyl or ethyl methacrylate, and in particular acrylic acid and hydroxyalkyl methacrylate such as hydroxyethyl methacrylate or hydroxyethyl acrylate, derivatives thereof such as 2-[[(butylamino)carbonyl]oxyl]ethyl acrylate.

Exemplary diacrylate polymer precursor compounds are urethane diacrylates, glycol diacrylates such as tripropylene glycol diacrylate, alkanediol diacrylates such as hexanediol diacrylate.

In a preferred embodiment of the additive manufacturing compositions according to the present invention, in the continuous liquid phase, the one or more alkoxylated inorganic precursor compound is methoxylated inorganic precursor compound, an ethoxylated inorganic precursor compound or propoxylated inorganic precursor compound.

In a preferred embodiment of the additive manufacturing compositions according to the present invention, in the continuous liquid phase, the one or more organic polymer have a thermal decomposition temperature which is superior to the temperature at which the one or more alkoxylated inorganic precursor compound undergo condensation.

In a more preferred embodiment of the additive manufacturing compositions according to the present invention, in the continuous liquid phase, the inorganic precursor compounds are non-modified inorganic precursor compounds in the sense that the inorganic precursor compounds are not chemically modified to include an acryloyl group, and more preferably are not chemically modified to include an acryloyl group, thiol group, vinyl group, methacryloyl group or epoxy group. In particular the alkoxylated inorganic precursor compounds are non-modified alkoxylated inorganic precursor compounds, in the sense that the alkoxylated inorganic precursor compounds are not chemically modified to include an acryloyl group, and more preferably are not chemically modified to include an acryloyl group, thiol group, vinyl group, methacryloyl group or epoxy group. This allows to include more than one alkoxylated inorganic precursor compound because not all alkoxylated inorganic precursor compounds can be functionalized with acryloyl groups. In a another preferred embodiment of the additive manufacturing compositions according to the present invention, in the continuous liquid phase, the one or more alkoxylated inorganic precursor compounds are mainly non-modified alkoxylated inorganic precursor compounds by weight and the total amount of modified alkoxylated inorganic precursor compounds is less than 5 weight percent, or less than 2 weight percent, or less than 1 weight percent with respect to the total weight of alkoxylated inorganic precursor compounds.

In another embodiment of the additive manufacturing compositions according to the present invention, the one or more photopolymerizable polymer organic precursor compound may be present in a range of from 20 weight % to 80 weight %, preferably 30 weight % to 70 weight %, and most preferably 40 volume % to 80 volume % with respect to the total volume of the continuous liquid phase capable of photoinduced phase separation into a bi-continuous bi-phasic structure.

In a preferred embodiment of the additive manufacturing compositions according to the present invention, the additive manufacturing composition according to claim 1, wherein it further comprises a solid particulate, in particular an inorganic solid particulate. In a more preferred embodiment of the additive manufacturing compositions according to the present invention, the solid particulate may be chosen from inorganic solid materials such as glass, ceramic or glass-ceramic particulates. Other possible solid particulate may be chosen from silica, alumina, titania and zirconia. The solid particulate preferably have a diameter of less than 1000 nm or between 1 nm and 1000 nm.

In a preferred embodiment of the additive manufacturing compositions according to the present invention, the additive manufacturing composition is provided in a flowable state. In the context of the present disclosure, "flowable" means that the viscosity is below of 1000 mPas, preferably below 500 mPas or between 0.1 and 500 mPas, more preferably below 100 mPas or between 0.1 and 100 mPas, even more preferably below 10 mPas or between 0.1 and 10 mPas and most preferably below 1.5 mPas or between 0.1 and 1.5 mPas when measured at 25° C. and with a shear rate below 100 l/s on an appropriate rheometer.

It is a further object of the present invention to provide a process for manufacturing an object, in particular an inorganic oxide object, comprising the step of forming a green body by additive manufacturing and the step of firing the green body to manufacture the object, wherein forming the green body by additive manufacturing comprises the steps of:
  a. providing a body of additive manufacturing composition according to the above in flowable state,
  b. irradiating at least part of the body of the additive manufacturing composition such as to bring about phase separation into a bi-continuous bi-phasic structure of the irradiated part of the body of additive manufacturing composition and allowing for the formation of a bi-phasic and bi-continuous structure in the irradiated part of the body of additive manufacturing composition such as to form at least a part of a green body to be manufactured, wherein one continuous phase is essentially formed by at least the one or more polymerized organic polymer precursor compound and one continuous phase is essentially formed by at least the one or more alkoxylated inorganic precursor compound,
  c. optionally repeating the previous step one or more times, preferably within a single layer using different compositions or upon multiple layers using different compositions, until the green body is formed, wherein firing the green body to manufacture the object comprises the steps of:
  d. firing the green body at a temperature sufficient to remove the polymerized organic polymer precursor compound and/or photopolymerizable organic polymer precursor compound to form the glass, ceramic or glass-ceramic object.

In the context of the present disclosure, the term "green body" designates a self-supporting structure that can be fired to provide an inorganic object, such as a glass, ceramic or glass-ceramic object.

The process for manufacturing an object comprises a first step of forming a green body by additive manufacturing, in which step the ability of the additive manufacturing composition to phase separate is key.

In a first substep, a body of additive manufacturing composition is provided in a flowable state. Thus, in particular in the case where the additive manufacturing is carried out using stereolithographic processes like for example DLP, the additive manufacturing composition has preferably a viscosity below of 500 mPas, more preferably below 100 mPas.

In the first substep, the body of additive manufacturing composition is provided, which may be held in either a vat filled with additive manufacturing composition in the case a stereolithographic process is used or may be held in a cartridge filled with additive manufacturing composition in the case a 3D inkjet, or other deposition process is used.

In a second substep, at least part of the body of the additive manufacturing composition is irradiated such as to bring about phase separation into a bi-continuous bi-phasic structure of the irradiated part of the body of additive manufacturing composition and allowing for the formation of a bi-phasic and bi-continuous structure in the irradiated part of the body of additive manufacturing composition such as to form at least a part of a green body to be manufactured, wherein one continuous phase is essentially formed by at least the one or more polymerized organic polymer precursor compound and one continuous phase is essentially formed by at least the one or more alkoxylated inorganic precursor compound. In the case a stereolithographic process is used, at least part of the body of the additive manufacturing composition can be irradiated by focusing a radiation beam on to the corresponding part of the body of the additive manufacturing composition in the vat, whereas if a 3D inkjet process is used, the corresponding part of the body of the additive manufacturing composition which has been discharged from the cartridge onto the substrate can be exposed to radiation. As is common in additive manufacturing processes, the second substep can be repeated for a given number of times until the desired green body is obtained, and it is possible to use the same or varying irradiation intensities when repeating the second substep to manufacture a green object having the same of varying porosity. The second substep can be repeated within a single layer using different compositions, or upon multiple layers using different compositions to manufacture a green object having a varying chemical composition.

The process for manufacturing an object, comprises a second step of firing the green body to manufacture the object, in which the green body is fired at a temperature sufficient to remove the polymerized organic polymer precursor compound and/or photopolymerizable organic polymer precursor compound to form the object. The one or more alkoxylated inorganic precursor compounds suitable in the context of the present invention will already condense at a temperature that is inferior to the temperature sufficient to remove the polymerized organic polymer precursor compound and/or photopolymerizable organic polymer precursor compound, and thus the inorganic object is concomitantly formed when firing the green body to remove the organic material. In one preferred embodiment, the removal of the polymerized organic polymer precursor compound and/or photopolymerizable organic polymer precursor compound is carried out at a temperature exceeding the glass transition temperature of the inorganic oxide material forming the object, since at this temperature the mobility of the thermal degradation of the polymerized organic polymer precursor compound and/or photopolymerizable organic polymer precursor compound is increased. An exemplary temperature at which the polymerized organic polymer precursor compound and/or photopolymerizable organic polymer precursor compound is removed is above 350° C., or between 350 and 450° C. or above 450° C. or between 450° C. and 550° C., whereas the alkoxylated inorganic precursor compounds suitable in the context of the present invention condense above 200° C. or between 250 and 350° C., more preferably above 350° C. or between 350° C. and 450° C.

In a preferred embodiment of the process for manufacturing an object according to the present invention, in step d. the green body is further fired at a temperature sufficient to form an object essentially consisting of an inorganic non-crystalline amorphous solid, an inorganic crystalline solid or an inorganic mixed crystalline-amorphous solid. After removal of the organic polymer from the green body, the resulting object is porous in the sense that the interconnected cavities previously filled by organic polymer are then void. The resulting porous object can further be fired at a sintering temperature in order to densify the porous object in a controlled manner. The further firing may be carried out in a contiguous step, i.e. without terminating the first firing by a cooling phase prior to further firing or may be carried out in a separate step by terminating the first firing by a cooling phase. In a preferred embodiment, the green body is further fired at a temperature sufficient to form an object essentially consisting of an inorganic non-crystalline amorphous solid, an inorganic crystalline solid or an inorganic mixed crystalline-amorphous solid in a separate further firing step.

In a preferred embodiment of the process for manufacturing an object according to the present invention, the additive manufacturing process is a stereolithographic process such as for example DLP 3D printing, inkjet, SLA, inverted SLA or 2-photon lithography.

In a preferred embodiment of the object according to the present invention, the objects obtainable by the above process for manufacturing include vessels; containers such as glasses, bottles, cups, mugs; laboratory glass objects; medical glass objects; jewelry such as pendants, earrings, rings, ornaments; optical devices such as fibers and lenses and three dimensional reinforcement composed of bi-phasic polymer, glass, ceramic, or glass-ceramic.

Experimental Data

Resin compositions are defined by weight percent of components. All chemicals were purchased from Sigma-Aldrich unless otherwise noted and used as provided. Triethyl phosphate (TEP), trimethyl borate (TMB), Poly(diethoxysiloxane) (PDEOS), were reagent grade and stored in a humidity-controlled cabinet. PDEOS was supplied by ABCR and was 48-52 equivalent wt % $SiO_2$. Acrylate monomers urethane diacrylate (UA(Neorad U25-20D by DSM Coating Resins) and tripropyleneglycol diacrylate (TPGDA) were used with polymerization inhibitor 4-methoxyphenol (MEHQ) as this plays an essential role in the oxygen inhibition necessary for digital light projection (DLP) 3D printing. A blue light absorbing dye, Sudan I, was added at 0.005 wt % relative to the total resin content to achieve reasonable vertical resolution. The photoiniator diphenyl(2,4,6-trimethylbenzoyl)-phosphine oxide (TPO) was added at 1.0 wt % of the total resin content. The compositions of resins 1-5 are listed in Table S1 below. The resulting resins had a viscosity comparable to that of water and were used directly after mixing.

TABLE S1

Compositions of phase-separating molecular inks

| Resin | UA (wt %) | TPGDA (wt %) | TEP (wt %) | TMB (wt %) | PDEOS (wt %) |
|---|---|---|---|---|---|
| 1 | 4.0 | 36.0 | 7.0 | 6.7 | 46.3 |
| 2 | 8.0 | 32.0 | 9.4 | 12.5 | 38.1 |
| 3 | 8.0 | 32.0 | — | 41.5 | 18.5 |
| 4 | 4.0 | 36.0 | 22.3 | 2.2 | 35.5 |
| 5 | 4.0 | 36.0 | 39.9 | — | 20.1 |

*Resin 1 with 1.4 wt % Sn(II)EH & 0.046 wt % $HAuCl_4$ to form Au doped, colored glass A commercial digital light processing (DLP) 3D printer, Autodesk Ember, was used to program the structure of the molecular inks. The intensity of the light was programmed on a per-voxel basis by modifying the greyscale level from 1-100% of the slice images in the print file. Illumination intensities were calibrated using a G&R Labs Model 222 light meter and the full range of greyscale intensity was determined to correspond linearly to 0-22 $mW/cm^2$. Exposure dose was held constant at 48.4 $mJ/cm^2$ for any given exposure, therefore the exposure time for 100% illuminated regions was 2.2 seconds and 1% illumination regions was 220 seconds. To prevent sticking to the PDMS print surface, an adhesive fluorinated ethylene propylene (FEP) film (McMaster Carr) was applied.

The pyrolysis of the phase-separated material includes the distinct steps of debinding of the acrylate polymer and condensation of the metal alkoxides. To investigate these processes thermogravimetric analysis (TGA), differential thermal analysis (DTA), and mass spectrometry (MS) were performed. A large drop in weight was observed using TGA over the range 350-440° C. followed by a more gradual drop in weight over the range 440-600° C. Correspondingly, DTA showed two exothermic peaks with minima at 420° C. and 530° C. The emitted materials were likely carbonaceous compounds and water. In-line mass spectroscopy recorded ions with mass-to-charge ratios of 18, 27, and 44, which are likely to correspond to the following compounds: $H_2O^+$ for m/z=18; $BO^+$ or $CH_2CH^+$ for m/z=27; and $CO_2^+$ or $CH_2CH_2O^+$ for m/z=44. A second set of emission peaks occurs at roughly 900° C. This is likely water and carbonaceous material trapped within the silica structure. As soon as the temperature exceeded the system glass transition temperature, the material had sufficient mobility to diffuse out of the component.

Figure 4:
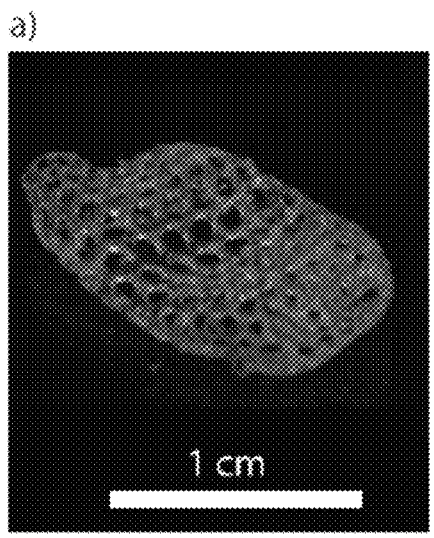
FIG. 4 shows high transparency, complex, boro-phosphosilicate alloy glass structures obtained by stereolithography using an additive manufacturing composition according to the present invention.
Figure 4:
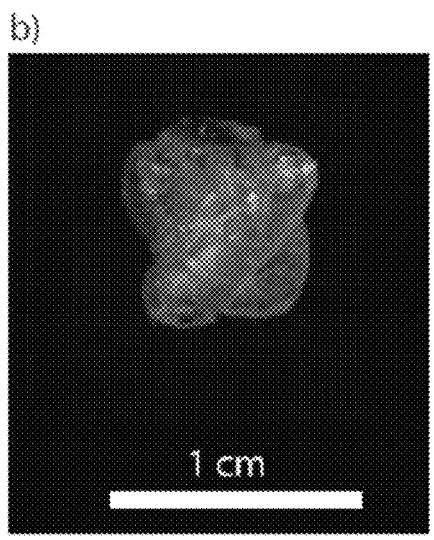
Figure 4:
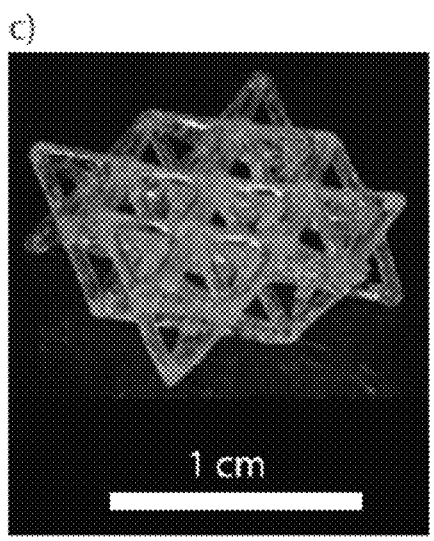

From these observations, a debinding and condensation heat treatment was created. All heating steps were performed with a heating rate of 0.40° C./min in a Nabertherm LT furnace. During heat cycle of the debinding process, holds were performed at 500° C. for 6 hours and at 700° C. for 4 hours to promote diffusion of trapped organic materials and water. Debound samples, printed as 5 mm tall, 5 mm diameter cylinders, were sintered in a TA Instruments DIL 806 dilatometer to determine the sintering temperature. Samples 3D printed with uniform illumination intensity of I=1%, I=10%, and I=100% were found to exhibit peaks in densification rate at 871° C., 893° C., 927° C. To prepare transparent glass samples, debound samples were further heated to 1000° C. and held for 4 hours. Finally, samples were cooled to room temperature at a rate of 1° C./min with a holding time of 12 hours at 500° C. to relax internal stresses caused by densification. The objects shown in FIGS. 4A, 4B, and 4C were obtained by the additive manufacturing process according to the present invention using resins 1, 2 and 3, respectively, as disclosed in Table S1.

Comparative Example 1

20 g of sol-gel ink was prepared by first dissolving 9.58 g of TEOS in 3 g of a hydrolysis solution of 65 wt % ethanol, 0.1 wt % HNO3 in triple distilled water which was then stirred for about 30 min. Subsequently, 0.054 g of photoinitiator Diphenyl(2,4,6-trimethylbenzoyl)phosphine oxide (TPO) and 1.06 g APTMS were added to the solution and stirred for another 30 min to ensure complete dissolution. After that, 0.094 g of ammonium acetate were dissolved in 6.2 g of 65 wt % ethanol in triple distilled water and added to the solution to form a mixture that was stirred again to obtain thorough mixing of all the components.

Figure 5:
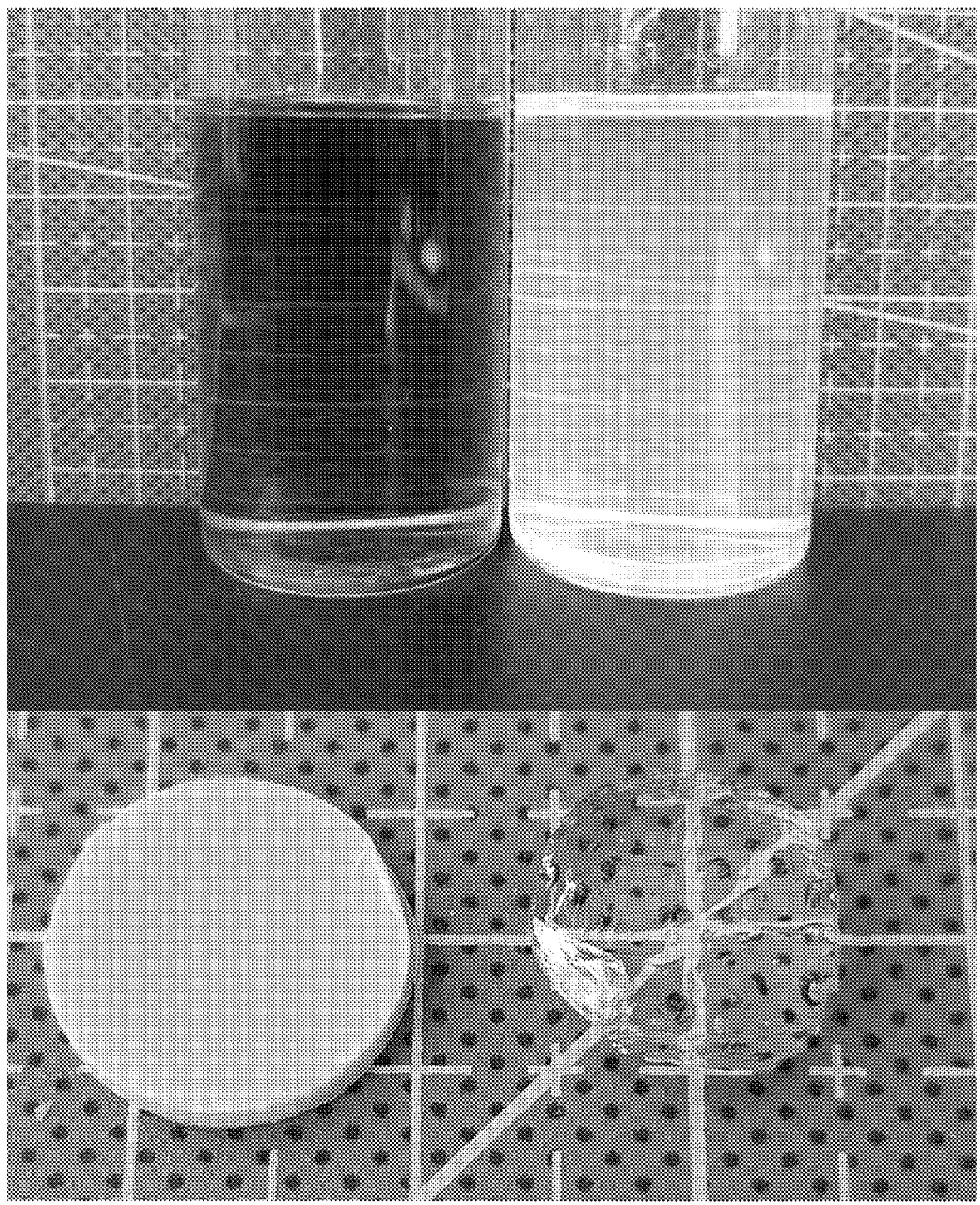
FIG. 5 shows a sample of a comparative sol-gel ink (upper right) and a sample of Resin 4 according to one embodiment of the present invention (upper left), each unpolymerized, and respectively a sample of sol-gel ink (bottom right) and a sample of Resin 4 (bottom left), each after being polymerized by irradiation.

After mixing, the translucent sample of sol-gel ink was polymerized by irradiation at 385 nm for 6 s at 20 mW/cm². For optical comparison, a sample of Resin 4 was also polymerized by irradiation and a photograph of both polymerized samples is shown in FIG. 5. As can be seen, the unpolymerized sample of Resin 4 (upper left) changes from translucent, monophasic solution to an opaque solid (bottom left) upon irradiation whereas the sol-gel ink of the unpolymerized sample according to Comparative Example 1 (upper right) changes from translucent, monophasic solution to a translucent solid (bottom right) upon irradiation.

The change in transparency, i.e. the increase in opacity in the sample of Resin 4 is due to the phase separation into a bi-phasic, bi-continuous structure occurring at as polymerization progresses. Consequently, the unchanged transparency of the sample according to Comparative Example 1, even after polymerization, is indicative of no phase separation. It is noted that a lack of transparency of printed "green" objects can be re-established during the subsequent firing step, when the organic phase of the bi-phasic and bi-continuous structure is removed.

The invention claimed is:
1. An additive manufacturing composition, comprising:
a continuous liquid phase capable of photoinduced phase separation into a bi-continuous bi-phasic structure comprising at least;
a. one or more inorganic precursor compound,
b. one or more photopolymerizable organic polymer precursor compound.

2. The additive manufacturing composition according to claim 1, wherein the continuous liquid phase further comprises one or more dye and/or one or more photoinitiator.

3. The additive manufacturing composition according to claim 1, wherein the continuous liquid phase comprises at least two or more inorganic precursor compounds.

4. The additive manufacturing composition according to claim 1, wherein in the continuous liquid phase, the one or more inorganic precursor compound is one or more selected from the group consisting of alkoxylated inorganic precursor compounds chosen from siloxanes, alkoxylated phosphates, alkoxylated titanates, alkoxylated zirconates, alkoxylated aluminates, alkoxylated borates and combinations thereof, halogenated inorganic precursor compounds and combinations thereof, alkylated inorganic precursor compounds and combinations thereof, and hydroxylated inorganic precursor compounds and combinations thereof.

5. The additive manufacturing composition according to claim 1, wherein in the continuous liquid phase, the one or more photopolymerizable polymer organic precursor compound is selected from the group consisting of acrylate polymer precursor compounds, vinyl polymer precursor compounds, urethane acrylate precursor compounds and derivatives thereof.

6. The additive manufacturing composition according to claim 1, wherein in the continuous liquid phase, the one or more inorganic precursor compound is one or more selected from the group consisting of methoxylated inorganic precursor compounds, ethoxylated inorganic precursor compounds, and propoxylated inorganic precursor compounds.

7. The additive manufacturing composition according to claim 1, wherein the additive manufacturing composition further comprises a solid particulate.

8. The additive manufacturing composition according to claim 1, wherein the continuous liquid phase comprises of from 20 volume % to 80 volume % of the one or more inorganic precursor compound with respect to a total volume of the continuous liquid phase capable of photoinduced phase separation into the bi-continuous bi-phasic structure.

9. A process for manufacturing an object, comprising the step of forming a green body by additive manufacturing and the step of firing the green body to manufacture the object, wherein forming the green body by additive manufacturing comprises the steps of:
a. providing a body of the additive manufacturing composition according to claim 1 in a flowable state,
b. irradiating at least part of the body to bring about phase separation into a bi-continuous bi-phasic structure of the irradiated part of the body of the additive manufacturing composition and allowing for the formation of a bi-phasic and bi-continuous structure in the irradiated part of the body of the additive manufacturing composition to form at least a part of a green body to be manufactured, wherein one continuous phase is essentially formed by at least the one or more polymerized organic polymer precursor compound and one continuous phase is essentially formed by at least the one or more alkoxylated inorganic precursor compound,
c. optionally repeating the previous step one or more times until the green body is formed,
wherein firing the green body to manufacture the object comprises the steps of:
d. firing the green body at a temperature sufficient to remove the polymerized organic polymer precursor compound and/or photopolymerizable organic polymer precursor compound to form the object.

10. The process for manufacturing an object according to claim 9, wherein, in the step d, the green body is further fired at a temperature sufficient to form an object essentially consisting of an inorganic non-crystalline amorphous solid, an inorganic crystalline solid or an inorganic mixed crystalline-amorphous solid.

11. The process for manufacturing an object according to claim 9, wherein the additive manufacturing process is a stereolithographic process.

12. An object obtained by the process for manufacturing an object according to claim 9, wherein the object comprises varying porosity.

13. The additive manufacturing composition according to claim 1, wherein the additive manufacturing composition further comprises an inorganic solid particulate.

14. The additive manufacturing composition according to claim 1, wherein the continuous liquid phase comprises of from 30 volume % to 70 volume % of the one or more inorganic precursor compound with respect to a total volume of the continuous liquid phase capable of photoinduced phase separation into the bi-continuous bi-phasic structure.

15. The additive manufacturing composition according to claim 1, wherein the continuous liquid phase comprises of from 40 volume % to 60 volume % of the one or more inorganic precursor compound with respect to a total volume of the continuous liquid phase capable of photoinduced phase separation into the bi-continuous bi-phasic structure.

* * * * *